United States Patent [19]

Takeshita

[11] Patent Number: 5,555,763

[45] Date of Patent: Sep. 17, 1996

[54] WORK LOADING AND UNLOADING DEVICE FOR BENDING MACHINE

[75] Inventor: Kazunori Takeshita, Kanagawa, Japan

[73] Assignee: Amada Metrecs Company, Limited, Kanagawa, Japan

[21] Appl. No.: 266,376

[22] Filed: Jun. 27, 1994

[30] Foreign Application Priority Data

Jun. 30, 1993 [JP] Japan .................................. 5-162749

[51] Int. Cl.⁶ .................................................. B21D 43/11
[52] U.S. Cl. .............................. 72/420; 72/422; 72/17.3
[58] Field of Search ............................ 72/422, 461, 420, 72/17.3; 901/14

[56] References Cited

U.S. PATENT DOCUMENTS

| | | |
|---|---|---|
| 4,150,936 | 4/1979 | Shioi et al. . |
| 4,555,217 | 11/1985 | Wright ..................... 901/14 |
| 4,706,491 | 11/1987 | Satorio ..................... 72/461 |
| 4,708,573 | 11/1987 | Hug ......................... 72/422 |
| 4,989,444 | 2/1991 | Murakami et al. .......... 72/422 |
| 5,005,394 | 4/1991 | Sartorio et al. ........... 72/10 |
| 5,187,958 | 2/1993 | Prunotto ................... 72/422 |
| 5,287,433 | 2/1994 | Prunotto et al. .......... 72/422 |

FOREIGN PATENT DOCUMENTS

| | | |
|---|---|---|
| 0213667 | 3/1987 | European Pat. Off. . |
| 0354559 | 2/1990 | European Pat. Off. . |
| 0532372 | 3/1993 | European Pat. Off. . |
| 2584633 | 1/1987 | France . |
| 3346160 | 8/1984 | Germany .................. 72/422 |
| 3407445 | 9/1985 | Germany . |
| 55-144330 | 11/1980 | Japan ..................... 72/422 |
| 63-264290 | 11/1988 | Japan . |
| 63-299828 | 12/1988 | Japan ..................... 72/422 |
| 3118921 | 5/1991 | Japan . |
| 4-135019 | 5/1992 | Japan ..................... 72/461 |
| 5-123764 | 5/1993 | Japan ..................... 72/461 |

OTHER PUBLICATIONS

*Machine Design;* Aug. 24, 1978; vol. #50, No. 19, "G.M. Developing 'Basis' Robot".
European Search Report.
Abstract of JP 63–264290.
Abstract of JP 3–118921.

*Primary Examiner*—M. Rachuba
*Assistant Examiner*—Donald M. Gurley
*Attorney, Agent, or Firm*—Greenblum & Bernstein P.L.C.

[57] ABSTRACT

In front of a bending machine is arranged a unit of a 5-axis control robot provided with a work hand at an end thereof, for loading work to the bending machine and unloading a bent work from the bending machine. A single-work taking-up device takes up only a single work from stacked works. Therefore, the work loading and unloading device is low in cost and requires a short program preparation and teaching (setup) time. The work loading and unloading device may be moved to any desired position and is provided with a work hand having a double-work take-up detecting device and an upper hand accessible to a bent work without interference with the punch.

7 Claims, 6 Drawing Sheets

WORK LOADING AND UNLOADING DEVICE FOR BENDING MACHINE

BACKGROUND OF THE INVENTION

1. Field of the Invention

The present invention relates to a work loading and unloading device for a bending machine, and more specifically to a device for loading work to a bending machine such as a press brake and further for unloading the bent work from the same bending machine.

2. Description of the Related Art

In the conventional work loading and unloading device for loading work to a bending machine such as a press brake and further for unloading out the bent work from the bending machine, a robot with a 6-axis control is fixedly arranged on the front side of a single bending machine, independently. In addition, the upper and lower hands openable to both sides are attached to a work hand of the robot.

In the above-mentioned conventional 6-axis control robot, however, there exists a problem in that the cost of the robot itself is high and further a long program preparation and teaching time (i.e., the setup time) is needed. In addition, since the conventional work loading and unloading device must be arranged for each bending machine separately, it is troublesome to use the same work loading and unloading device for the other bending machines.

Further, in the conventional work loading and unloading device, when work is brought into contact with a back gage, since the work hand brings the work toward and near the back gage under clamped condition, in the case where a small-sized work is brought into contact with the back gage under clamped condition, there exists a problem in that the work hand interferes with a die, before the work is brought into contact with the back gage. Further, when the already bent work is clamped by the work hand, since the work hand also interferes with the die, the moving stroke of the work hand must be reduced. However, since the work hand is not provided with a double-work take-up detecting device, the double-work taking-up must be detected on the work loading device side, so that it takes a relatively long time to detect the double work taking-up.

SUMMARY OF THE INVENTION

With these problems in mind, therefore, it is the primary object of the present invention to provide a work loading and unloading device for a bending machine, which is low in cost and a short time in required for program preparation and teaching time (setup time), and which can be arranged and located as needed in front of a desired bending machine. Further, the work loading and unloading device is provided with a work hand which can clamp the work without interfere with the die and further can detect double-work taking-up.

To achieve the above-mentioned object, the present invention provides a work loading and unloading device for a bending machine, comprising: a 5-axis control robot provided with a work hand at an end thereof, for loading work to the bending machine and unloading a bent work from the bending machine; and a single-work taking-up device for taking up only a single work from stacked works.

Further, the work loading and unloading device further comprises a base for mounting both said 5-axis control robot and said single-work taking-up device as a unit; a plurality of wheels attached to said base, for allowing said base to be movable; a plurality of locating engage blocks disposed at a lower portion and at roughly a middle portion of said base; and a plurality of locating blocks installed on a floor in front of the bending machine and engaged with said locating engage blocks of said base, to locate the work loading and unloading device in front of the bending machine.

Further, the work hand comprises: a work hand body; an upper hand attached to said work hand body; a lower hand attached to said work hand body; a work push member disposed at at least one of said upper and lower hands, for pushing the work mounted on a die against a back gage of the bending machine; and a spring for urging said work push member against the work.

Further, the work hand comprises: a work hand body; a lower hand attached to said work hand body; an upper hand attached to said work hand body so as to be pivotal relative to said lower hand; and a double-work take-up detecting device attached to said work hand body, for detecting whether two works are clamped simultaneously between said lower and upper hands.

Further, the work hand comprises: a work hand body; and an upper hand and a lower hand, one of said upper and lower hands being fixedly attached to said work hand body and the other of said upper and lower hands being pivotally attached to said work hand body.

Further, the 5-axis robot comprises: a fixed arm base; a first arm member rotatable around a vertical axis and rotatably supported by said fixed arm base; a second arm member pivotal around a first horizontal axis and pivotally supported at one end of said first arm member; a third arm member pivotal around a second horizontal axis and pivotally supported at one end of said second arm member; a fourth arm member pivotal around a third horizontal axis and pivotally supported at one end of said third arm member; a fifth arm member pivotal around a fourth horizontal axis and pivotally supported by said fourth arm member; and the work hand removably attached to an end of said fifth arm member.

Further, the single-work taking-up device comprises: a device base; a vertical cylinder having a vertical piston rod; a suction arm member attached to a top of said vertical piston rod; and a plurality of suction pads for sucking up only a single work from stacked works.

Further, the double-work take-up detecting device comprises: a hollow cylindrical member attached to a work hand body of the work hand; a contact member disposed within and insulated from said hollow cylindrical member; a movable member disposed within said hollow cylindrical member on a side remote from said contact member; a spring also disposed within said hollow cylindrical member so as to urge said movable member outward from said hollow cylindrical member; an adjust bolt having a head and loosely passed through said contact member and fitted to said movable member; and when a single work is clamped between said upper and lower arms of said work hand, said movable member being moved inward into said hollow cylindrical member against an elastic force of said spring by an arm member attached to said upper hand, to bring the head of said adjust bolt away from said contact member to output a turn-off detection signal; and when two works are clamped between said upper and lower arms of said work hand, said movable member being moved outward from said hollow cylindrical member by an elastic force of said spring, to bring the head of said adjust bolt into contact with said contact member to output a turn-on detection signal.

In the work loading and unloading device for a bending machine according to the present invention, since the 5-axis control robot and the single-work taking-up device are arranged in front of a bending machine, after a single work is taken from stacked works by the single-work taking-up device, the taken-up work is further clamped by the work hand provided at an end of the robot and then supplied to the bending machine. The work bent by the bending machine is clamped again by the work hand of the robot and then conveyed out.

Since the 5-axis control robot and the single-work taking-up device are both arranged on the base in a unit, it is possible to take up a single work from stacked works and then supply to the taken-up work to the bending machine, and further to convey out the bent work from the bending machine, all automatically.

Further, since the wheels and the locating engage blocks (engageable with the locating blocks fixed on the floor in front of the bending machine) are provided for the base, it is possible to locate the 5-axis control robot and the single-work taking-up device freely at any desired position in front of a bending machine only when necessary.

Further, since the work push member is provided for at least one of the upper and lower hands of the work hand, it is possible to securely push even a small-sized work against the back gage of the bending machine without interference with the die.

Further, since the work hand body is provided with the double-work take-up detecting device, it is possible to prevent two works from being taken out of stacked works simultaneously and from being supplied to the die.

Further, since at least one of the upper and lower hands of the work hand is fixed to the work hand body and the other thereof is pivotally mounted on the same work hand body, it is possible to clamp even a small-sized work, without interference with the die.

DETAILED DESCRIPTION OF THE EMBODIMENTS

An embodiment of the present invention will be described hereinbelow with reference to the attached drawings.

Figure 1:
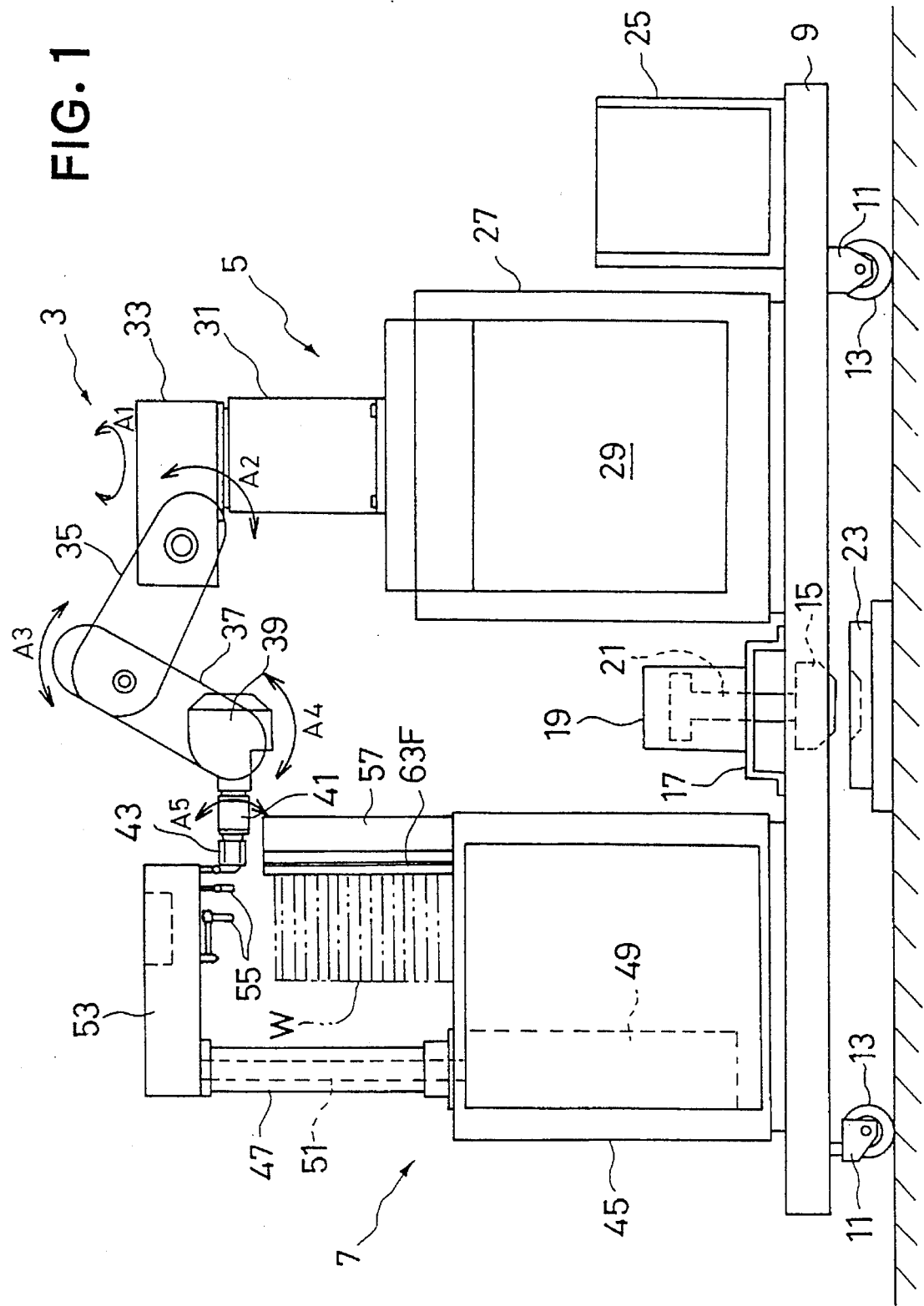
FIG. 1 is a front view showing an embodiment of the work loading and unloading device for a bending machine according to the present invention.
Figure 2:
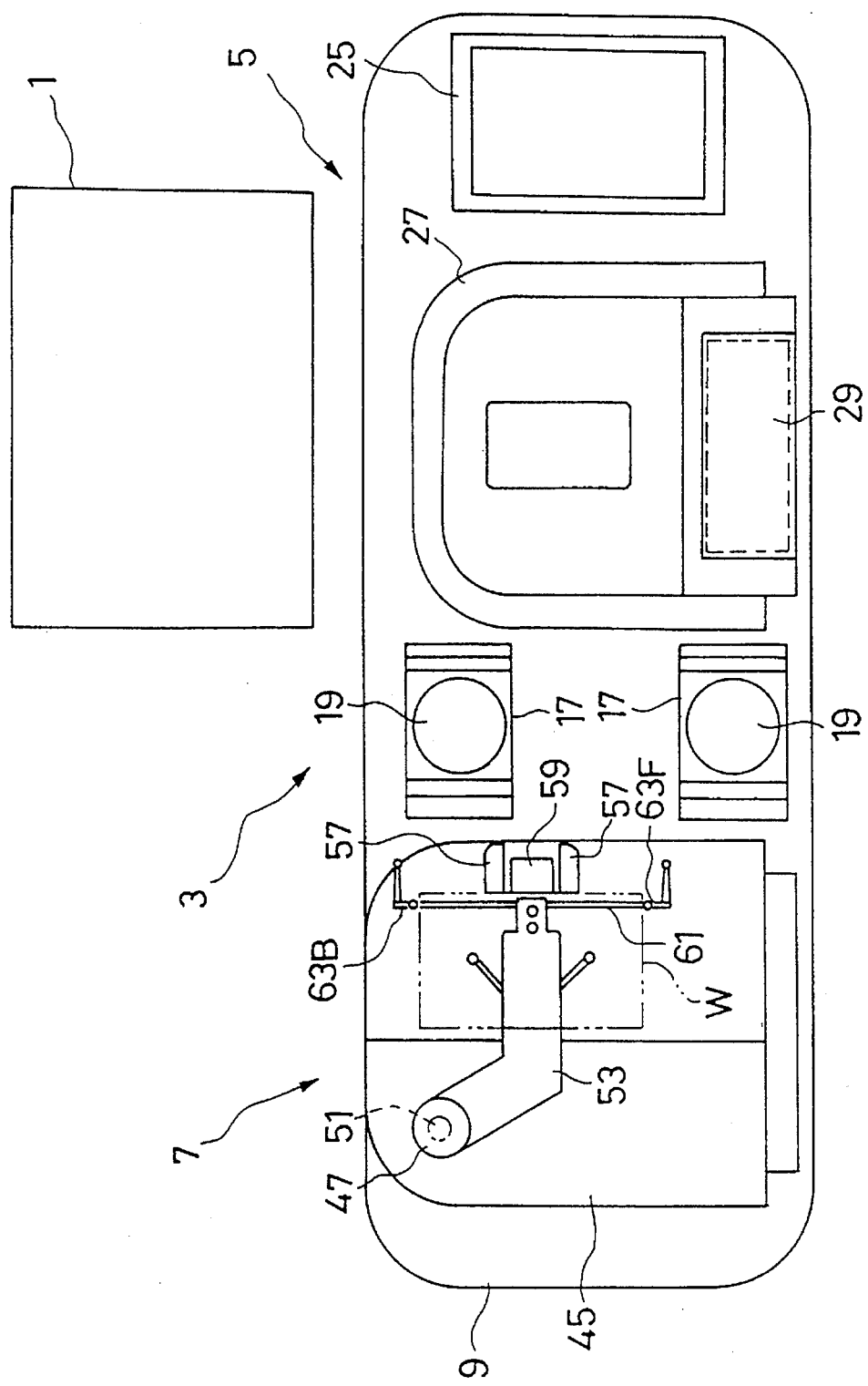
FIG. 2 is a plan view showing the same work loading and unloading device shown in FIG. 1.

With reference to FIGS. 1 and 2, in front of a press brake (as an example of a bending machine), a work loading and unloading device 3 is arranged. This work loading and unloading device 3 is mainly composed of a 5-axis robot 5 and a single-work taking-up device 7. The robot 5 and the single-work taking-up device 7 are mounted on a rectangular base 9 as a unit.

The base 9 is provided with a plurality of rotatable wheels 13 via a bracket 11, respectively, on the front and rear and right and left sides of the lower portion of the base 9. Further, the base 9 is provided with a plurality of locating engage blocks 15 at roughly the middle portion of the base 9. In more detail, a support bracket 17 is attached to roughly the middle portion of the base 9, and a hydraulic cylinder 19 is mounted on the support bracket 17. A piston rod 21 fitted into this hydraulic cylinder 19 is formed integral with the locating engage blocks 15 at the end of the piston rod 21.

On the floor of the front side of the press brake 1 (see FIG. 2), a plurality of locating blocks 23 are disposed so as to be engaged with and disengaged from the locating engage blocks 15 attached to the base 9, respectively.

Owing to the construction as described above, the work loading and unloading device 3 provided with the base 9 on which the robot 5 and the single-work taking-up device are arranged can be moved from another position to the front side of the press brake 1. Further, for location of the device 3, the hydraulic cylinder 19 is actuated to move the piston rod 21 downward, so that the locating engage blocks 15 are engaged with the locating blocks 23, respectively.

Further, when the work loading and unloading device 3 is required to be used for another press brake 1, the hydraulic cylinder 19 is actuated to move the piston rod 21 upward, so that the locating engage blocks 15 are all disengaged free from the locating blocks 23. Accordingly, the work loading and unloading device 3 can be moved to any required place. Further, a product accommodating box 25 for accommodating the bent work (products) is mounted on the base 9 and on the side of the robot 5.

The robot 5 is provided with a robot body 27 mounted on the base 9. On the front surface of the robot body 27, a console panel 29 is attached. An arm base 31 is fixed on the robot body 27; an end of a first arm member 33 rotatable around a vertical (A1) axis is rotatably supported by the arm base 31; an end of a second arm member 35 pivotal around a horizontal (A2) axis is pivotally supported by the other end of the first arm member 33; an end of a third arm member 37 pivotal around a horizontal (A3) axis is pivotally supported by the other end of the second arm member 35; a fourth arm member 39 pivotal around a horizontal (A4) axis is pivotally supported on the other end of the third arm member 37; an end of a robot hand 41 rotatable around a horizontal (A5) axis is pivotally supported by the fourth arm member 39; and a work hand 43 is removably attached to the other end of the robot hand 41. The driving mechanisms of these arm members 33, 35, 37 and 39 and these hands 41 and 43 are all well known, so any detailed description thereof is omitted herein.

In the robot 5 as described above, whenever the console panel 29 is operated, since the respective arm members and the hands are all controllably manipulated, it is possible to control the motion of the work hand 43 so that the work W can be clamped or unclamped by the work hand 43 in accordance with the 5-axis control.

The single-work taking-up device 7 is provided with a device body 45 mounted on the base 9. On this device body 45, a vertically extending guide post 47 is disposed. Further, a vertically movable cylinder 49 is provided within the device body 45. A piston rod 51 fitted into this vertically movable cylinder 49 is housed in and guided along the guide post 47. The end of the piston rod 51 is fixed to an end of the suction arm member 53. The suction arm member 53 has a plurality of suction pads 55.

Owing to the construction as described above, when the vertically movable cylinder 49 is actuated, since the suction arm member 53 is moved up and down via the piston rod 51 under guidance of the guide post 47, the suction pads 55 are also moved up and down.

On the right side of the device body 45 in FIG. 2, two front stoppers 57 for locating horizontal positions of the work ends of stacked works W are provided so as to be opposed to each other. Further, a magnet separator 59 for separating the work ends is interposed between the two front stoppers 57, also as shown in FIG. 2. The device body 45 is formed with a groove 61 extending in the front and rear direction (vertical direction in FIG. 2). Further, two side stoppers 63F and 63B are slidably engaged with this groove 61, respectively.

Owing to the construction as described above, the works W stacked on the device body 45 are located in both directions by the two front stoppers 57 and the two side stoppers 63F and 63B, respectively, and in addition, the work end thereof is separated by the magnetic separator 59.

The operation of taking out the work W stacked on the device body 45 one by one; clamping the taken-up work by the robot 5; unloading the clamped work W to the bending machine; further clamping the work bent by the press brake 1; and dropping the conveyed work into the product accommodating box 25 will be described hereinbelow in sequence.

First, the magnet separator 59 is activated to separate the first work W from the second work W. Under these conditions, the suction pads 55 are lowered to suck the first separated work W. Then, the suction pads 55 which suck the first work W are moved upward to the uppermost end. Under these conditions, the robot 5 is manipulated under 5-axis control to clamp the work W by the work hand 43. At the same time, the suction pads 55 are released from the work W, so that the work W is clamped by only the work hand 43.

Further, the robot 5 is manipulated under the 5-axis control to supply the work W clamped by the work hand 43 to the press brake 1. The press brake 1 bends the supplied work W into a determined bending shape. By manipulating the robot 5 again, the work W bent by the press brake 1 is clamped again by the work hand 43 of the robot 5 and further conveyed over the product accommodating box 25. At this position, the work W is unclamped by the work hand 43 to drop the bent work W into the product accommodating box 25.

As described above, it is possible to supply the stacked work W to the press brake 1 one by one and further to convey the bent work W automatically by operating the single-work taking-up device 7 and the robot 5 under the 5-axis control.

In the robot 5 according to the present invention, since the robot 5 is controlled under the 5-axis control by reducing the one-axis from the conventional 6-axis control, it is possible to economize the program preparation time and the teaching time, so that the setup time of the bending processing can be reduced. In addition, since the axis-control is reduced from the 6-axis control to the 5-axis control, it is possible to manufacture the work loading and unloading device 3 at a lower cost, as compared with the conventional device.

Further, since the work loading and unloading device 3 can be movable to any positions without being fixed to only the front side of the press brake 1, it is possible to use the device 3 by setting it in front of any required press brake 1 and further to move the device 3 to any appropriate keeping places.

When a small-sized work W is to be bent, the work hand 43 is replaced with another work hand determined according to the work dimensions. Further, before the work is bent by the press brake 1, the work W is unclamped from the work hand 43. Further, after the work W has been bent, the bent work W is clamped again by the work hand 43 and then conveyed outward.

Figure 3:
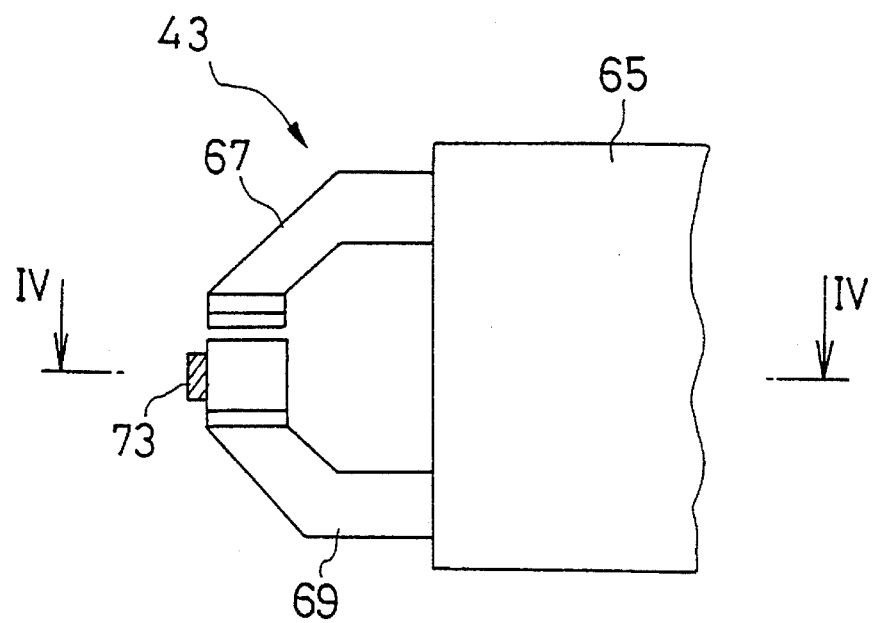
FIG. 3 is a front view showing an embodiment of the work hand of the work loading and unloading device according to the present invention.
Figure 4:
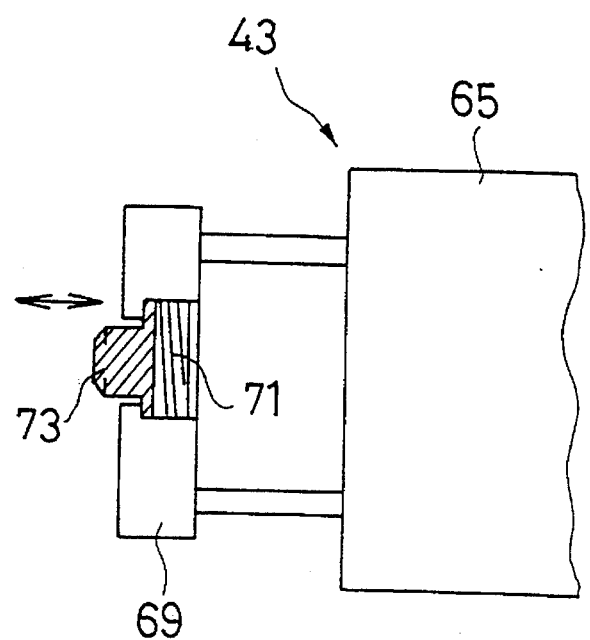
FIG. 4 is a cross-sectional view taken along the lines IV—IV shown in FIG. 3.

With reference to FIGS. 3 and 4, the work hand 43 will be described in further detail hereinbelow. The work hand 43 is provided with a work hand body 65. In front of the work hand body 65, an upper hand 67 and a lower hand 69 are arranged. Further, a work push member 73 is disposed in the lower hand 69 in such a way as to be urged outward by a spring 71.

Figure 5A:
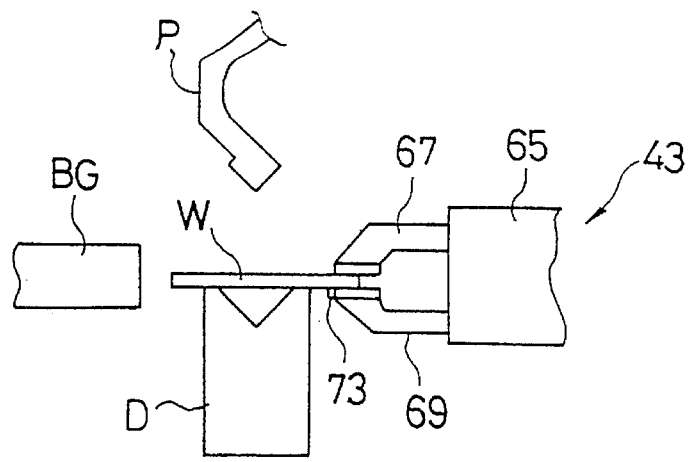
FIGS. 5A to 5C are illustrations for assistance in explaining the function of work hand when work is pushed against a back gage of a bending machine by a work push member provided for the work hand.
Figure 5B:
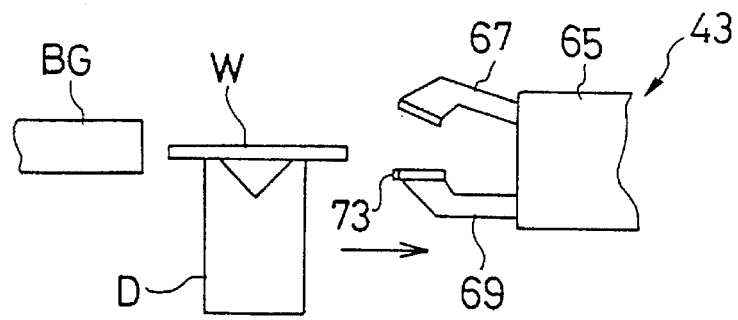
Figure 5C:
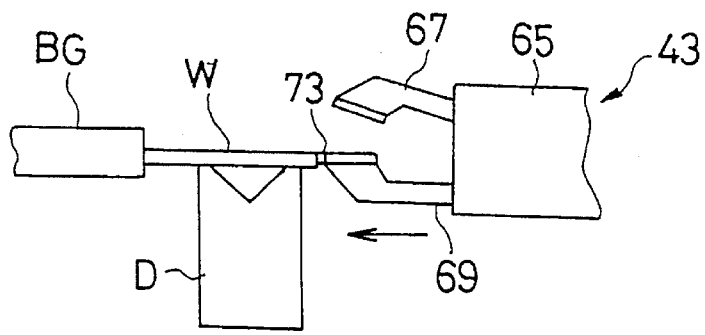

In the construction of the work hand 43 as described above, when the work W is required to be bent in cooperation of a punch P and a die D, the work W must be first brought into contact with a back gage BG located in back of the punch P. In this case, as shown in FIG. 5A, the work W clamped between the upper hand 67 and the lower hand 69 of the work hand 43 is once supplied or mounted onto the die D. After that, as shown in FIG. 5B, the work W is unclamped by releasing the upper and lower hands 67 and 69, and further the work hand 43 is moved away from the work W frontward. After that, as shown in FIG. 5C, the work W is pushed slightly rearward (toward the right) against the back gate BG by moving the work hand 43 again. In this case, the end surface of the work W is pushed against the back gage BG by the work push member 73 provided at the rear end of the lower hand 69. In this case, it is possible to locate the work W accurately in contact with the back gate BG on the basis of the elastic function of the spring 71. In addition, it is possible to bring the work W into contact with the back gage BG without interference of the work hand 43 with the die D.

Further, in the above-mentioned embodiment, although the work push member 73 is provided at an end of the lower hand 69, it is possible to obtain the same effect by providing the work push member 73 at an end of the upper hand 67.

Figure 6:
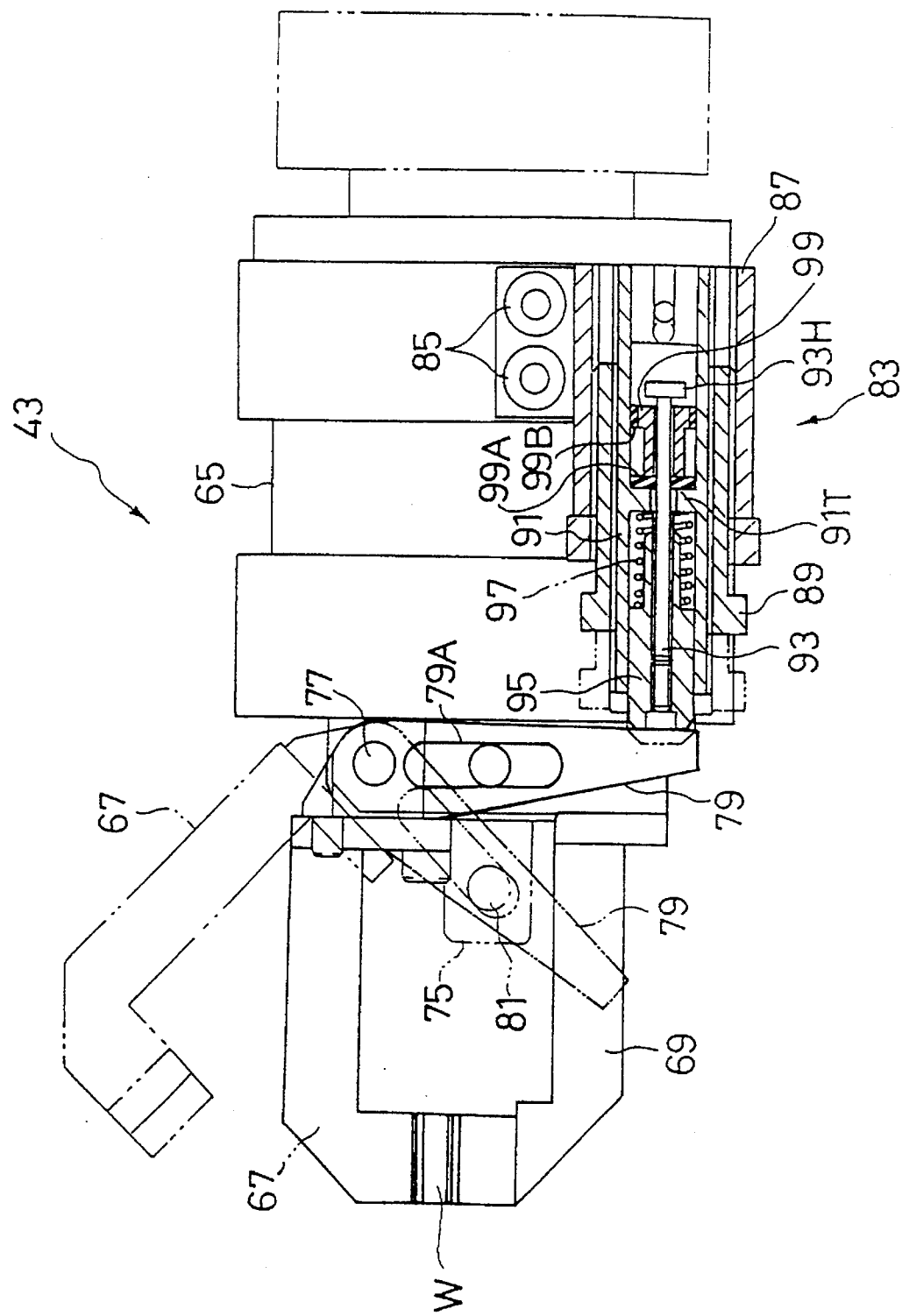
FIG. 6 is a front view showing another embodiment of the work hand according to the present invention.

FIG. 6 shows another embodiment of the work hand 43 of the present invention, in which the same reference numerals have been retained for the similar parts or elements which have the same functions as the embodiment shown in FIG. 3. In this embodiment, as shown in FIG. 6, a hydraulic cylinder (not shown) is provided within the work hand body 65. The end of a piston rod 75 fitted into this hydraulic cylinder projects toward the left side from the work hand body 65 in FIG. 6, before clamping the work W. Further, on the Upper left side of the work hand body 65 in FIG. 6, an upper hand 67 and an arm member 79 formed integral with the upper hand 67 are pivotally supported by a pin 77. The arm member 79 is formed with a slot 79A at roughly a middle portion thereof. Therefore, the arm member 79 is connected to the end of the piston rod 75 via another pin 81 engaged with the slot 79A of the arm member 79.

In the construction as described above, when the hydraulic cylinder provided within the work hand body 65 is actuated, since the piston rod 75 positioned as shown in FIG. 6 is retracted toward the right side, the pin 81 is moved rightward. Accordingly, the upper hand 67 and the arm member 79 are both pivoted in the counterclockwise direction about the pin 77, so that the work W can be clamped between the upper hand 67 and the lower hand 69. In addition, the pivoted lower arm member 79 actuates a double-work take-up detecting device 83 as described below in further detail.

That is, within the work hand body 65, a double-work take-up detecting device 83 is mounted. In more detail, a detection body 87 is mounted on the work hand body 65 with the use of a plurality of bolts 85. A sleeve 89 is screwed into this detection body 87, and further a hollow cylindrical member 91 is also screwed into this sleeve 89.

Within this hollow cylindrical member 91, a contact member 99 is provided on the right side of the project portion 91T of the hollow cylindrical member 91. The contact member 99 is insulated from the hollow cylindrical member 91 by use of an insulating washer 99A interposed between the project portion 91T and the left end surface of the contact member 99 and further by use of an insulating ring 99B interposed between the inner circumferential surface of the hollow cylindrical member 91 and the outer circumferential surface of the contact member 99. Further, on the left side of the project portion 91T of the hollow cylindrical portion 91, a movable member 95 is provided so as to be slidably movable within the hollow cylindrical member 91 in the right and left direction. A spring 97 is interposed between this movable member 95 and the project portion 91T of the hollow cylindrical member 91 so as to always urge the movable member 95 toward the left side. Further, an adjust bolt 93 formed with a head 93H on the leftmost end thereof and extending in the right and left (horizontal) direction in FIG. 6 is pressure-fitted to the movable member 95 and loosely passed through the central through hole of the contact member 99, as shown in FIG. 6. Therefore, the contact member 99 and the adjust bolt 93 constitute a detection switch. When the adjust bolt 93 is positioned as shown in FIG. 6, since the head 93H of the adjust bolt 93 is kept away from the right end surface of the contact member 99, the detection switch is kept off. However, when the adjust bolt 93 is moved toward the left side, since the head 93H is brought into contact with the contact member 99, the detection switch is turned on.

In the above-mentioned construction, under the condition that a single work W is correctly clamped between the upper hand 67 and the lower hand 69 as shown in FIG. 6, the head 93H of the adjust bolt 93 is positioned so as to be kept away (turned off) from the contact member 99 by adjustably moving the adjust bolt 93 relative to the movable member 95 in the right and left direction, to obtain a setup status.

In the double-work take-up detecting device 83 as adjusted as described above, when a single work W is correctly clamped between the upper hand 67 and the lower hand 69, since the arm member 79 is simultaneously pivoted counterclockwise in FIG. 6, the movable member 95 is moved toward the right side, so that the adjust bolt 98 is kept away from the contact member 99 to turn off the detection switch, with the result that it is possible to detect the single work clamping.

On the other hand, when two works W are erroneously clamped between the upper hand 67 and the lower hand 69, since the arm member 79 is not sufficiently pivoted counterclockwise as with the case as shown in FIG. 6, the movable member 95 cannot move toward the right side and is moved toward the left side by an elastic force of the spring 97, so that the adjust bolt 93 is also moved toward the left side by the movable member 95 and thereby the head 93H of the adjust bolt 93 is brought into contact with the contact member 99 to turn on the detection switch, with the result that it is possible to detect the double work clamping. In this connection, when no work is clamped between the upper hand 67 and the lower hand 69, although the arm member 79 is pivoted further in the counterclockwise direction, since the arm member 79 is stopped by an appropriate stopper (not shown), it is possible to keep the detection switch turned off.

Further, in the above-mentioned double-work take-up detecting device 83, although the detection switch is turned on whenever two works are erroneously clamped, it is of course possible to construct the detecting device 83 in such a way that the detection switch is turned off whenever two works are clamped erroneously.

Figure 7:
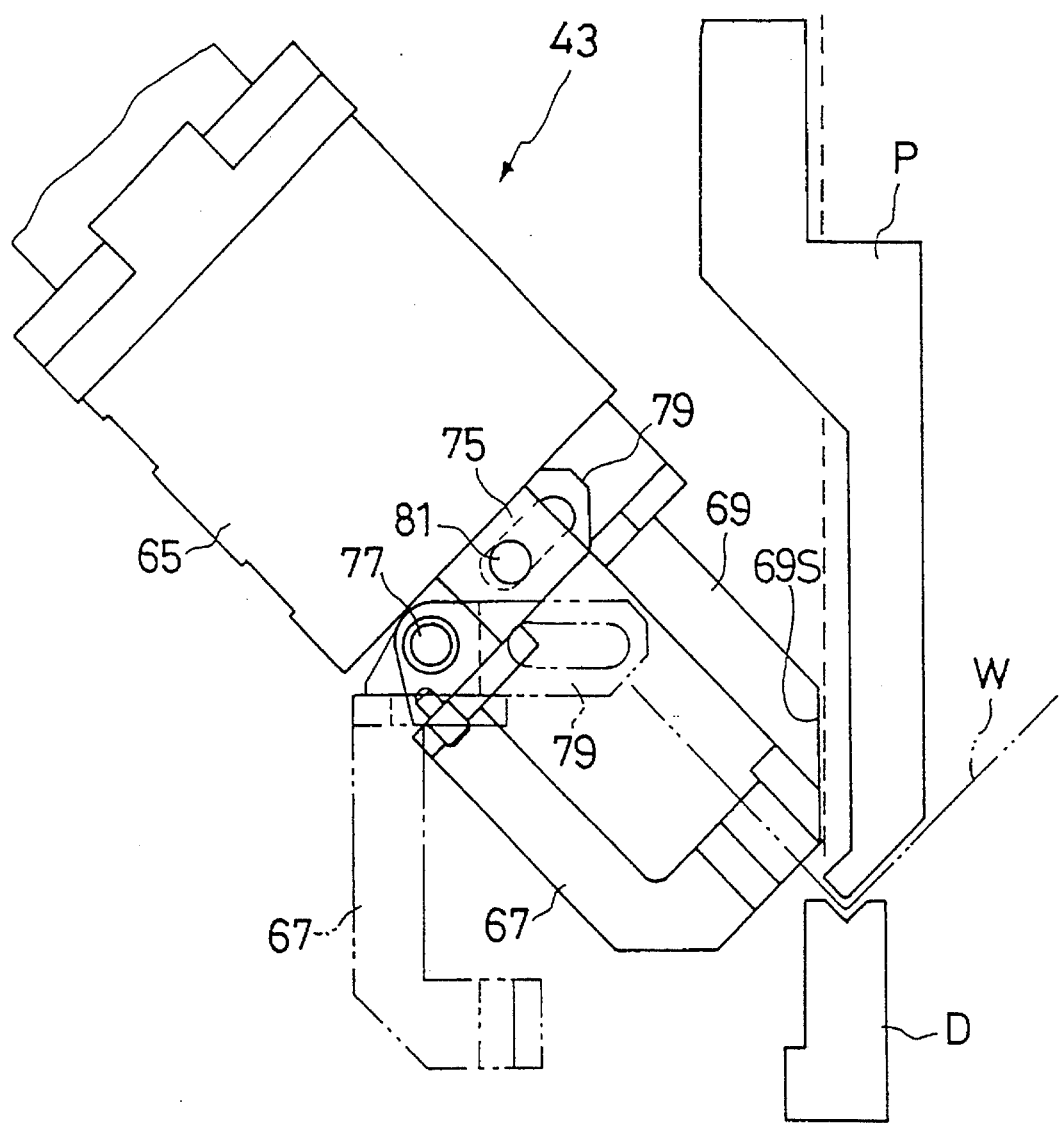
FIG. 7 is a front view showing still another embodiment of the work hand according to the present invention.

FIG. 7 shows another embodiment of the work hand 43, in which the same reference numerals have been retained for the similar parts or elements which have the same functions as in FIG. 6, without repeating any detailed description thereof. In this embodiment, the work hand 43 is not provided with the double-work take-up detection device 83. When the work W already bent by the punch P and die D is required to be clamped by the work hand 43 of this embodiment, as shown in FIG. 7, since a sloped surface 69S of the lower hand (fixed side hand) 69 is brought near the punch P and then the upper hand 67 is pivoted for clamping the bent work W between both the hands 67 and 69, it is possible to prevent interference of the work hand 43 with the punch P. In this embodiment, there exists such an advantage that it is possible to clamp a short bent work W without interference with the punch P.

As described above, in the work loading and unloading device for a bending machine according to the present invention, since the 5-axis control robot provided with a work hand is used, it is possible to automatically supply the work and convey the bent work in spite of the short program preparation and teaching (setup) time, thus reducing the production cost of the bending process.

Further, since the work loading and unloading device is movably constructed, it is possible to use the device at any desired positions without fixing the device in front of only a specific bending machine. Further, it is also possible to move the device to a keeping position when not used.

Further, in the work hand according to the present invention, since either one of the upper and lower hands is provided with a work push member, it is possible to securely bring the work into contact with the back gage of the bending machine without any interference with the die.

Further, in the work hand according to the present invention, since the upper hand is pivoted toward the lower hand and further since the double-work take-up detection device is attached to the work hand, it is possible to detect the abnormal case where two works are clamped erroneously by the work hand.

Further, since the work hand is composed of a fixed hand and a pivotal hand, it is possible to clamp even a short bent work without interference with the punch P.

What is claimed is:

1. A work loading and unloading device for a bending machine, comprising:

a 5-axis control robot provided with a work hand at an end thereof, for loading work to the bending machine and unloading a bent work from the bending machine, said work hand including a work hand body, a lower hand attached to said work hand body, an upper hand attached to said work hand body so as to be pivotal relative to said lower hand, and a double-work take-up detecting device attached to said work hand body, for detecting whether two works are clamped simultaneously between said lower and upper hands; and a single-work taking-up device for taking up only a single work from stacked works.

2. The work loading and unloading device of claim 1, which further comprises a base for mounting both said 5-axis control robot and said single-work taking-up device as a unit.

3. The work loading and unloading device of claim 1, which further comprises:

a base for mounting both said 5-axis control robot and said single-work taking-up device as a unit;

a plurality of wheels attached to said base, for allowing said base to be movable;

a plurality of locating engage blocks disposed at a lower portion and at roughly a middle portion of said base; and a plurality of locating blocks installed on a floor in front of the bending machine and engaged with said locating engage blocks of said base, to locate the work loading and unloading device in front of the bending machine.

4. The work loading and unloading device of claim 1, wherein the work hand further comprises:

a work push member disposed at at least one of said upper and lower hands, for pushing the work mounted on a die against a back gage of the bending machine; and a spring for urging said work push member against the work.

5. The work loading and unloading device of claim 1, wherein said 5-axis robot comprises:

a fixed arm base;

a first arm member rotatable around a vertical axis and rotatably supported by said fixed arm base;

a second arm member pivotal around a first horizontal axis and pivotally supported at one end of said first arm member;

a third arm member pivotal around a second horizontal axis and pivotally supported at one end of said second arm member;

a fourth arm member pivotal around a third horizontal axis and pivotally supported at one end of said third arm member;

a fifth arm member pivotal around a fourth horizontal axis and pivotally supported by said fourth arm member; and the work hand removably attached to an end of said fifth arm member.

6. The work loading and unloading device of claim 1, wherein said single-work taking-up device comprises:

a device base;

a vertical cylinder having a vertical piston rod;

a suction arm member attached to a top of said vertical piston rod; and a plurality of suction pads for sucking up only a single work from stacked works.

7. The work loading and unloading device of claim 1, wherein said double-work take-up detecting device comprises:

a hollow cylindrical member attached to a work hand body of the work hand;

a contact member disposed within and insulated from said hollow cylindrical member;

a movable member disposed within said hollow cylindrical member on a side remote from said contact member;

a spring also disposed within said hollow cylindrical member so as to urge said movable member outward from said hollow cylindrical member;

an adjust bolt having a head and being loosely passed through said contact member and fitted to said movable member; and when a single work is clamped between said upper and lower arms of said work hand, said movable member is moved inward into said hollow cylindrical member against an elastic force of said spring by an arm member attached to said upper hand, to bring the head of said adjust bolt away from said contact member to output a turn-off detection signal; and when two works are clamped between said upper and lower arms of said work hand, said movable member is moved outward from said hollow cylindrical member by an elastic force of said spring, to bring the head of said adjust bolt into contact with said contact member to output a turn-on detection signal.

* * * * *